Patented Jan. 10, 1939

2,143,470

UNITED STATES PATENT OFFICE 2,143,470

RUBBER COMPOSITION

Wilhelm Becker, Cologne-Mulheim, and Albert Koch, Cologne-Deutz, Germany, assignors to I. G. Farbenindustrie Aktiengesellschaft, Frankfort-on-the-Main, Germany No Drawing. Application October 4, 1935, Serial No. 43,634. In Germany October 24, 1934

1 Claim. (Cl. 106—23)

The present invention relates to new rubber compositions of increased fire resistance properties.

We are aware of the fact that many attempts to improve the fire resistance of rubber mixtures have been made; however, no clear success has been reached up to the present time. One has proposed, for instance, to incorporate within the rubber mixtures highly chlorinated naphthalenes which are distinguished by their high fireproofing capacity. However, these compounds in order to produce a remarkable fireproofing effect must be added to the rubber mixture in such an amount as would impair the mechanical properties such as tensile strength of the vulcanizates to an undue extent.

It is the object of the present invention to prepare in a simple and economical manner a rubber mixture which though having considerably improved fire resisting capacities does not show any remarkable loss in mechanical properties.

Another feature of our invention resides in the preparation of fireproof rubber compositions which can be employed for the preparation of pipes, floor covering materials, stuffings, belts, rubberized textiles and similar materials which are exposed to a hard mechanical stress.

It is to be understood that our invention includes vulcanized as well as unvulcanized rubber mixtures, the fire resisting properties of the composition being in no way impaired by the vulcanization process and the vulcanization ingredients.

With these and other objects in view our invention primarily consists in a rubber composition having incorporated therewith a high molecular weight compound of a high chlorine content and chlorinated polynuclear aromatic hydrocarbons. Examples for high molecular weight compounds of the character described are chlorinated rubber, polyvinylchloride and such polymerizates as have been subjected to an afterchlorination process such as afterchlorinated polyvinylchloride, afterchlorinated polyvinylesters and afterchlorinated halogenbutadiene polymerizates. Examples for chlorinated polynuclear aromatic hydrocarbons of the character described are chlorinated naphthalenes, chlorinated phenanthrenes, chlorinated anthracenes and chlorinated diphenyls, the latter being preferably employed. The preferred form of our invention resides in the employment of these additions in an amount at least equal to that of the rubber material the use of smaller amounts being not excluded from the scope of our invention. The proportions of the chlorine containing ingredients can be varied within wide limits depending on the required properties. An increased content of the polymeric compounds effects an increase in strength of the vulcanizates, whereas, on the other hand, the softness of the vulcanizates increases with an increase of the content of chlorinated aromatic compounds. The chlorine content of the ingredients and the relative proportions thereof are preferably so chosen that the total chlorine content of the rubber mixture is not less than about 50%.

As to the rubber materials which serve as basic materials for the preparation of our new compositions our invention is in no way limited to natural rubber and similar materials such as balata, it being understood that synthetic rubbers such as polymerizates of butadienes can be employed in a similar manner.

Obviously, our mixtures may contain besides the usual vulcanization ingredients various mineral filling agents without departing from the sense of our invention. Preferably such filling agents are employed as have a fireproofing effect by themselves. Examples of such additions are magnesium carbonate, kieselguhr, kaolin or phosphates.

Our rubber mixtures can be prepared by incorporating on the roller a mixture of the chlorinated products with the rubber. The intimate mixing of the chlorinated products can be effected by dissolving the same in an organic solvent and isolating the mixture of the chlorinated products from the solutions thus formed by evaporation of the solvent or by the addition of a precipitating agent. Another method of working consists in melting the chlorinated aromatic hydrocarbons and adding thereto the polymeric compounds in question while stirring at elevated temperature.

The following examples illustrate the invention without, however, restricting it thereto, the parts being by weight:

Example 1

To a melt of 80 parts of chlorinated diphenyl (chlorine content 59%) 20 parts of chlorinated rubber (chlorine content 61%) are added while stirring at 100–105° C. After 30 minutes stirring a clear melt is obtained which after cooling is mixed on the roller with 100 parts of rubber, furthermore with 80 parts of kieselguhr,
15 parts of zinc white,
3.2 parts of sulfur,
1.5 parts of a condensation product of aldol and
    α-naphthylamine (as antiperishing agent) and
3 parts of a mixture consisting of mercaptobenzothiazoldisulfide, hexamethylenetetramine and diphenylguanidine (as accelerator).

After heating this mixture for 30 minutes to 137° C. a fire-proof, high elastic soft vulcanizate is obtained.

Example 2

100 parts of rubber are mixed on the mill with a mixture of 67,5 parts of chlorinated diphenyl,
  37,5 parts of chlorinated rubber and
  45 parts of chlorinated naphthalene.

Thereupon 100 parts of magnesiumcarbonate,
  50 parts of kieselguhr,
  15 parts of zinc white,
  3,2 parts of sulfur,
  3 parts of a mixture consisting of mercaptobenzothiazoldisulfide, hexamethylenetetramine and diphenylguanidine (as accelerator),
  1,5 parts of a condensation product of aldol and α-naphthylamine (as antiperishing agent)
  1 part of stearic acid are added while working the mixture on the mill. After heating this mixture for 30 minutes to 137° C. a fireproof vulcanizate is obtained which is somewhat softer than the product obtained according to Example 1.

Example 3

100 parts of rubber are mixed on the mill with a mixture of 50 parts of chlorinated diphenyl,
  25 parts of chlorinated rubber and
  25 parts of chlorinated naphthalene (chlorine content 60%).

Then 100 parts of magnesium carbonate,
  15 parts of zinc white,
  3 parts of sulfur,
  1,5 parts of a condensation product of aldol and α-naphthylamine (as antiperishing agent)
  3 parts of a mixture of mercaptobenzothiazoldisulfide, hexamethylenetetramine and diphenylquanidine (as accelerator)

are incorporated within this mixture on the mill. After heating this mixture to 137° C. a fireproof vulcanizate is obtained which shows mechanical properties similar to those of the usual rubber vulcanizates.

Example 4

51 parts of chlorinated diphenyl (chlorine content 59%) are melted while stirring at a temperature of 100–105° C. with 26 parts of molten chlorinated naphthalene (chlorine content 60%). 23 parts of a chlorination product of polyvinylchloride are gradually added thereto. After cooling the melt is intimately mixed on the mill with 100 parts of rubber
  100 parts of magnesium carbonate,
  15 parts of zinc white,
  3 parts of sulfur,
  1,5 parts of a condensation product of aldol and α-naphthylamine (as antiperishing agent) and
  3 parts of a mixture of mercaptobenzothiazoldisulfide, hexamethylenetetramine and diphenylguanidine (as accelerator).

After heating this mixture for 30 minutes to 137° C. under pressure a fireproof, elastic vulcanizate is obtained.

Example 5

100 parts of rubber are mixed on the mill with a mixture of 75 parts of chlorinated diphenyl and
  25 parts of an afterchlorinated, polymerized vinylchloride.

Within this mixture 100 parts of magnesium carbonate,
  50 parts of kieselguhr,
  15 parts of zinc white,
  3,2 parts of sulfur,
  3 parts of a mixture of mercaptobenzothiazoldisulfide, hexamethylenetetramine and diphenylguanidine (as accelerator),
  1.5 parts of a condensation product of aldol and α-naphthylamine (as antiperishing agent)

and 1 part of stearic acid are incorporated on the mill. After heating this mixture to 137° C. for 30 minutes a fireproof high elastic vulcanizate is obtained.

Example 6

A melt consisting of 25 parts of chlorinated rubber,
25 parts of chlorinated diphenyl,
25 parts of polyvinylchloride and
 5 parts of phenoxypropene hydroxide are intimately mixed with 75 parts of rubber,
75 parts of magnesium carbonate,
12 parts zinc white,
 2 parts of sulfur,
 1 part of a condensation product of aldol and α-naphthylamine and
 3 parts of a mixture of mercaptobenzothiazoldisulfide, hexamethylenetetramine and diphenylguanidine.

The mixture thus obtained yields a fireproof vulcanizate.

Example 7

To a melt consisting of 80 parts of chlorinated diphenyl (chlorine content about 59%) 20 parts of an afterchlorinated 2-chlorobutadiene polymerizate are added while stirring at a temperature of about 100° C. On cooling 100 parts of rubber,
  80 parts of kieselguhr,
  15 parts of zinc white,
  3,2 parts of sulfur,
  1,5 parts of a condensation product of aldol and α-naphthylamine (as antiperishing agent) and
  3 parts of a mixture of mercaptobenzothiazoldisulfide, hexamethylenetetramine and diphenylguanidine (as accelerator)

are mixed therewith on the mill. After heating the mixture to 137° C. for 30 minutes a fireproof, high elastic, soft vulcanizate is obtained.

We claim:—

A rubber mixture having incorporated therewith a chlorinated diphenyl, a chlorinated naphthalene and a high molecular weight film-forming organic compound of high chlorine content selected from the group consisting of chlorinated rubber, polyvinyl chloride, after-chlorinated polyvinyl chloride, after-chlorinated polyvinyl esters and after-chlorinated halogen butadiene polymerizates, the total chlorine content of the mixture of rubber plus the high molecular weight film-forming compound plus the chlorinated diphenyl plus the chlorinated naphthalene being not substantially below about 50% and the composition being capable of being worked and vulcanized like natural rubber and yielding vulcanizates which show no tendency to exude any of the said ingredients.

WILHELM BECKER.
ALBERT KOCH.